United States Patent [19]

Mugglestone et al.

[11] Patent Number: 5,069,555
[45] Date of Patent: Dec. 3, 1991

[54] LINEAR BEARING ASSEMBLY

[75] Inventors: Peter R. Mugglestone, Northport; Alison Ng, New York, both of N.Y.

[73] Assignee: Thomson Industries, Inc., Port Washington, N.Y.

[21] Appl. No.: 565,045

[22] Filed: Aug. 9, 1990

[51] Int. Cl.$^5$ ............................................. F16C 29/06
[52] U.S. Cl. ...................................................... 384/43
[58] Field of Search .......................... 384/43, 44, 45; 464/168

[56] References Cited

U.S. PATENT DOCUMENTS

| | | |
|---|---|---|
| 3,545,826 | 12/1970 | Magee et al. |
| 4,695,170 | 9/1987 | Teramachi ........................ 384/43 |
| 4,717,264 | 1/1988 | Walter et al. ...................... 384/43 |
| 4,723,850 | 2/1988 | Albert. |
| 4,789,249 | 12/1988 | Mutolo ............................... 384/43 |
| 4,869,600 | 9/1989 | Tonogai ............................. 384/45 |

FOREIGN PATENT DOCUMENTS 3326601 2/1985 Fed. Rep. of Germany.

OTHER PUBLICATIONS

Deutsche Star GmbH Catalog, dated Apr. 1989.

*Primary Examiner*—Lenard A. Footland
*Attorney, Agent, or Firm*—Dilworth & Barrese

[57] ABSTRACT

A linear bearing assembly is provided including a housing for receiving a plurality of axial ball retainers and bearing plates therein. The housing includes a pair of end caps disposed in both longitudinal ends of the bearing assembly with the end caps having a plurality of angled ball turnarounds formed therein. The bearing plates and axial ball retainers form portions of a plurality of ball tracks with the bearing plates having grooves formed in an inner radial surface thereof for defining a top radial portion of the load bearing paths and circumference grooves defining side walls of the return paths. The bearing plates and axial ball retainers are arranged so as to allow optimization of ball track quantities to radial height of the overall bearing assembly and thus increase ball track quantities and load/life characteristics of the bearing assembly.

14 Claims, 5 Drawing Sheets

LINEAR BEARING ASSEMBLY

BACKGROUND OF THE INVENTION

1. Field of the Invention

This invention relates to linear bearing assemblies, and more particularly to multiple track linear bearing assemblies for longitudinal movement along a shaft.

2. Description of the Related Art

Linear recirculating ball bearing assemblies having multiple tracks for longitudinal movement along a shaft are known in the art. See, for example, U.S. Pat. No. 3,545,826 entitled Compliant and Self-Aligning Ball Bearing for Linear Motion. These bearing assemblies typically have a housing which forms a plurality of ball tracks arranged in radial planes with respect to the longitudinal axis of the shaft. Each of the ball tracks has a load-bearing path wherein the balls contact the shaft and a radially outwardly spaced return path for recirculating the balls back to the load-bearing path. Turnarounds are positioned at each axial end of the ball tracks to interconnect the load-bearing and return paths.

The housing may be formed of separate subassemblies for ease of manufacture and reduced cost. For example, a skeletal cage-type housing can be used as a framework for separate axially aligned bearing plates and ball guides. See, for example U.S. Pat. No. 4,717,264. In the alternative, the housing may serve as guides for the balls in the load-bearing path and incorporate turn-around end caps therein as shown in U.S. Pat. No. 4,723,850.

These designs for such linear bearing assemblies have some inherent drawbacks. For example, in the bearing of U.S. Pat. No. 4,717,264, the raceway rail has a load bearing surface and a single return surface, both formed in a lower side of the raceway rail. This arrangement does not make efficient usage of the space surrounding the rail and inhibits the placement of an optimum number of load bearing paths for a given surface area. Also, the ball turnaround structure creates a tight arc for reversal which limits the speed capacity and can result in jamming of the balls.

Similarly, the bearing of U.S. Pat. No. 4,723,850 utilizes ball loops arranged in a radial plane with respect to the axis of the shaft with ball turnarounds interconnecting load bearing and return paths of the ball loops. These radially arranged ball loops also result in wasted space and require larger radius bearing assemblies than would otherwise be necessary.

It is highly desirable to be able to configure the bearing plates, ball retainers and recirculating tracks within the housing of this type of bearing assembly so as to obtain a compact and efficient assembly for a given size.

Accordingly, it is one object of the present invention to provide a linear bearing assembly having bearing plates, ball retainers and recirculating tracks assembled within a housing which permits compact and efficient arrangement of load-bearing and return paths of the recirculating tracks to optimize ball track quantities to radial height of the bearing.

It is a further object of the present invention to provide a linear bearing assembly which provides compact and efficient arrangement of recirculating ball tracks while permitting ease of manufacture and assembly as well as improved load/life characteristics.

These and other highly desirable and unusual results are accomplished by the present invention in a linear bearing assembly having a plurality of ball guides and bearing plates uniquely arranged in a housing to allow an optimum number of load-bearing tracks along the inner radial surface of the bearing assembly adjacent the shaft.

Objects and advantages of the invention are set forth in part herein and in part will be obvious therefrom, or may be learned by practice with the invention, which is realized and attained by means of instrumentalities and combinations pointed out-in the appended claims. The invention consists of novel parts, constructions, arrangements, combinations, steps and improvements herein shown and described.

SUMMARY OF THE INVENTION

Accordingly, the present invention provides a multiple track linear motion recirculating ball bearing assembly which includes a housing for receiving a plurality of axial ball retainers and bearing plates longitudinally therein. Ball turnarounds in the form of half-toroidal cutouts are formed in the end caps of the housing and interconnect load bearing and return paths of the ball tracks formed by the axial ball retainers and bearing plates. Inner guides for the half-toroidal cutout may be positioned at the center axis of the cutout to facilitate smooth transition-from the load-bearing portion to the return portion of the ball tracks.

The bearing plates, axially aligned in the housing, are the primary load carrying members. These plates are axially grooved on a radial inner surface to minimize stresses when loaded. Both longitudinal sides of each bearing plate are shaped to define the side walls of the return path of a ball track.

Axial ball retainers are also provided axially within the housing to guide the balls on the load bearing path of the ball track and to position the bearing plates. For ease of manufacture and assembly, the inner guides may be fixed to the ends of the axial ball retainers.

The bearing assembly of the present invention positions the ball return path of the ball track at a radial angle different from the radial angle of the load bearing path thus allowing for interleaving of load bearing and return paths of the ball track. This angled ball return allows for an optimization of ball track quantities while substantially reducing the radial height of the bearing assembly. Also, by allowing for increased ball track quantities, the bearing assembly has improved load characteristics and a longer useful life.

BRIEF DESCRIPTION OF THE DRAWINGS

The accompanying drawings, referred to herein and constituting a part hereof, illustrate the preferred embodiments of the bearing assembly of the present invention and, together with the description, serve to explain the principles of the invention.

DETAILED DESCRIPTION OF PREFERRED EMBODIMENTS

Figure 1:
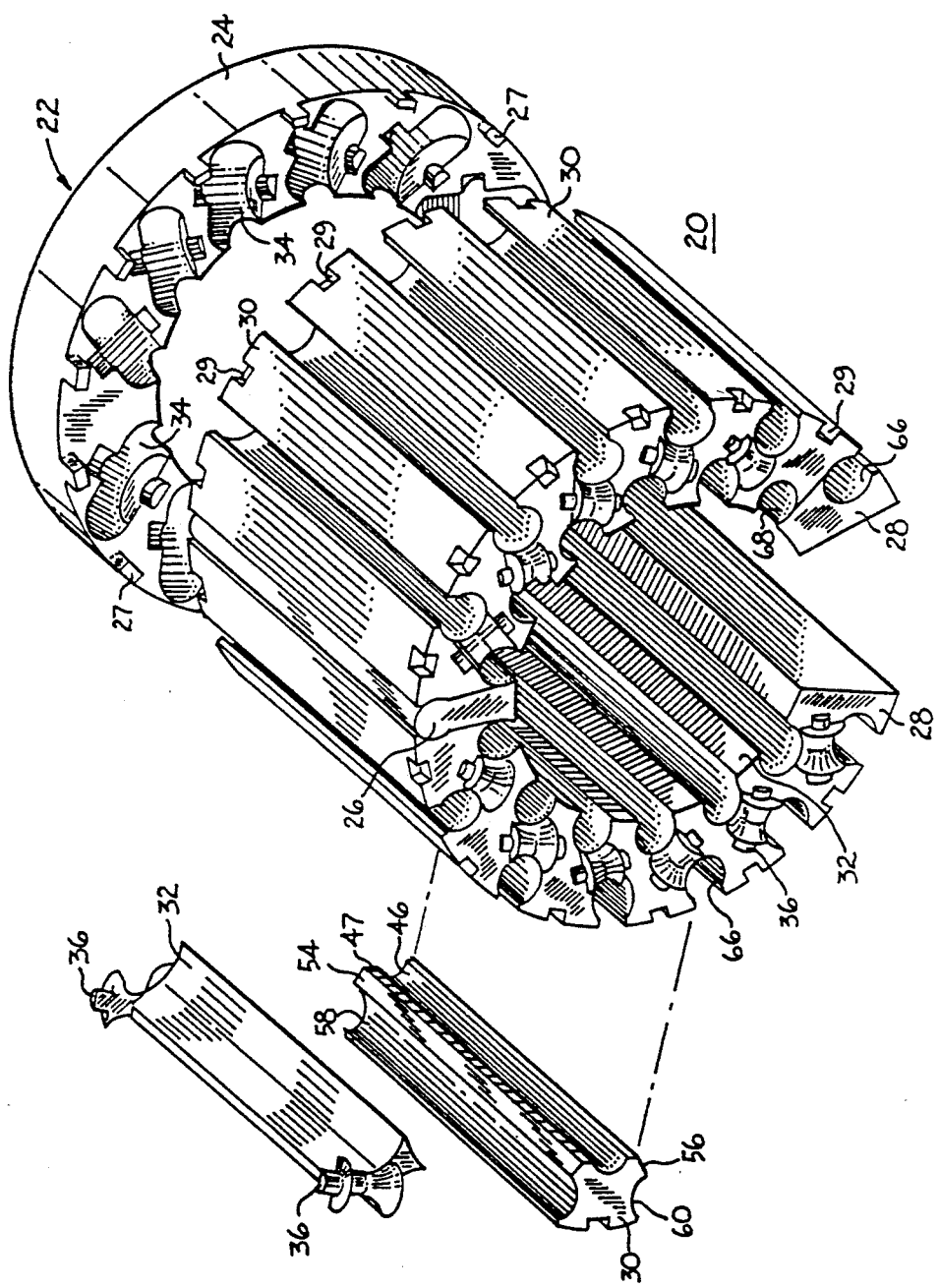
FIG. 1 is an exploded perspective view of a linear bearing assembly in accordance with one embodiment of the present invention.

Referring to FIG. 1, there is shown a linear open type bearing assembly 20 in accordance with a preferred embodiment of the present invention. A housing 22 comprising a pair of end caps 24, a top support 26 and a pair of bottom supports 28 serve to support and axially align the load carrying members or bearing plates 30 and axial ball retainers 32. The end caps 24 are provided with a plurality of half-toroidal cavities 34 in the internal face of the end caps and form the outer wall of the ball turn around.

In this embodiment of the present invention the inner wall of the ball turn around is formed by inner guides 36. These inner guides may preferably be formed in the shape of a portion of the inner axis of a toroid as shown in FIG. 1. Alternatively, the inner guides may be formed in a variety of other shapes including cylindrical (50 in FIG. 2), conical, triangular, etc. For ease of fabrication and assembly, inner guides 36 may be integrally formed on either end of axial ball retainer 32, or be integrally formed in end cap 24 (not shown).

All of the non-load bearing members including the end caps 24, axial ball retainers 32, top support 26, bottom supports 28 and inner guides 36 are preferably molded of a strong engineering plastic, for example, polyacetals, polycarbonates, polyamides, etc. One skilled in the art, however, would realize that other materials and fabrication methods also would be appropriate.

In the embodiment of FIG. 1, the end caps 24 of housing 22 are provided with a plurality of projections 27 arranged annularly around the circumference thereof. These projections interfit with slots 29 formed in the proximate and distal ends of bearing plates 30 as shown and, when assembled, combine to retain the bearing plates in position.

Figure 4:
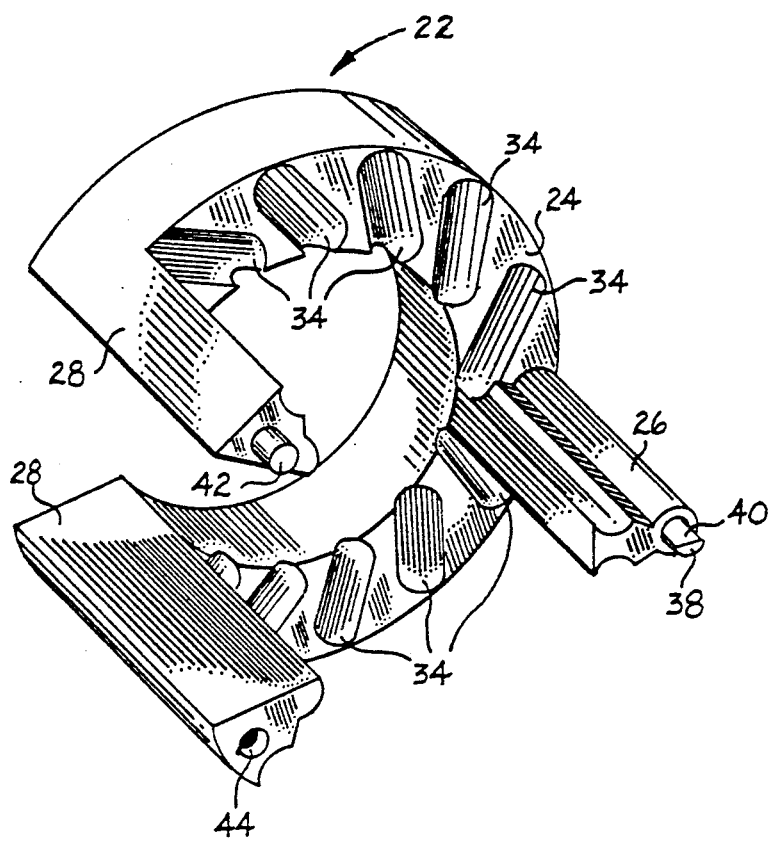
FIG. 4 is a perspective view of a housing member in accordance with an embodiment of the present invention.

In the preferred embodiment shown in FIG. 4, housing 22 is molded in two opposing interlocking halves. A variety of joining methods are contemplated by the present invention and are shown in the art including adhesive bonding, welding, heat sealing, etc. In the embodiment of FIG. 4, top support 26 is provided with a half-cylinder shaped pin 38 which interfits with a mating half-cylinder shaped hole 40 in the opposing half of housing 22 (not shown). Bottom supports 28 are provided with pins 42 and holes 44 which interfit with mating holes and pins in the opposing half of the housing.

Figure 2:
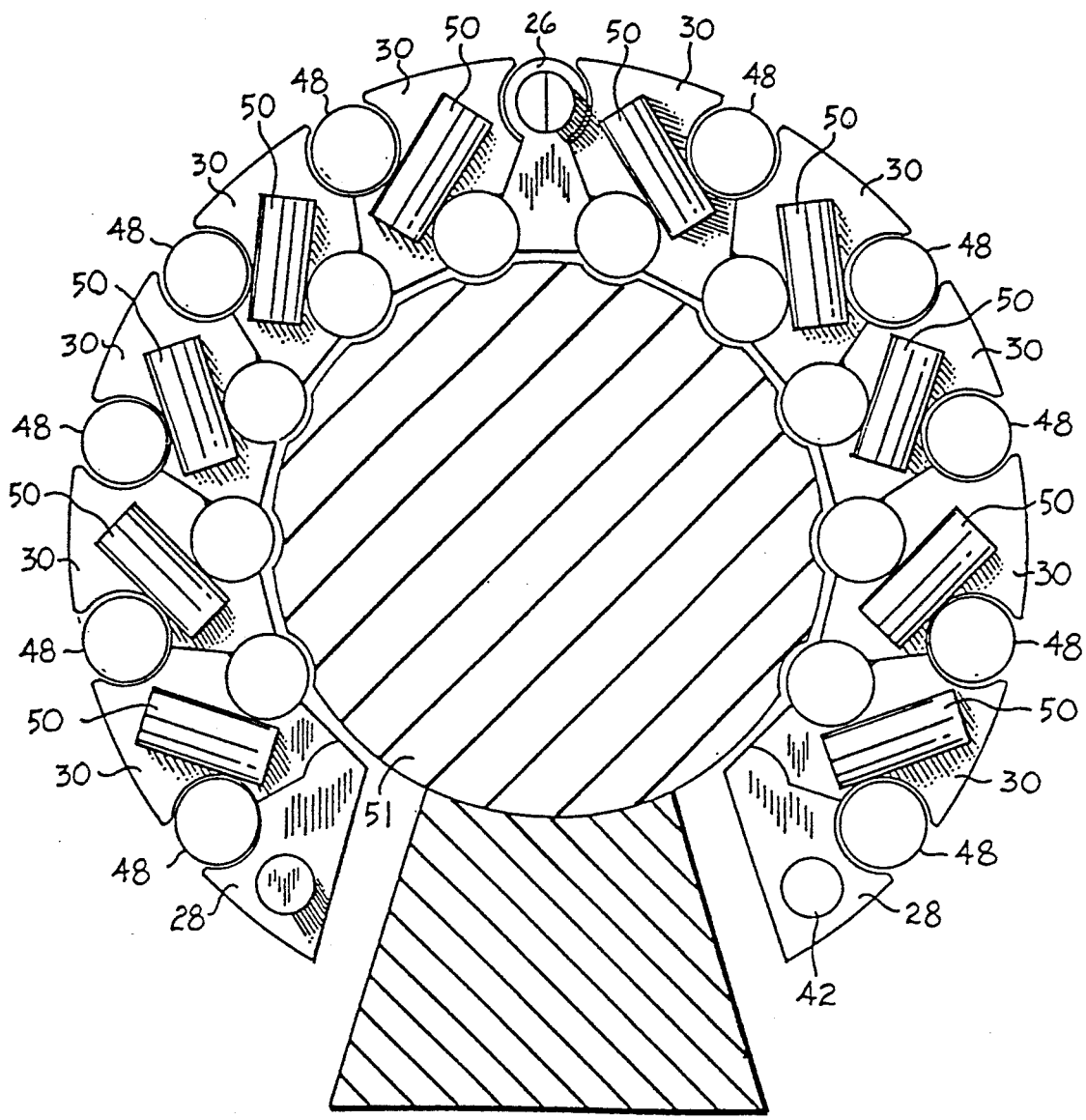
FIG. 2 is a side view in cross-section of a linear bearing in accordance with another embodiment of the present invention showing the inner guides and grooved shaft.
Figure 5:
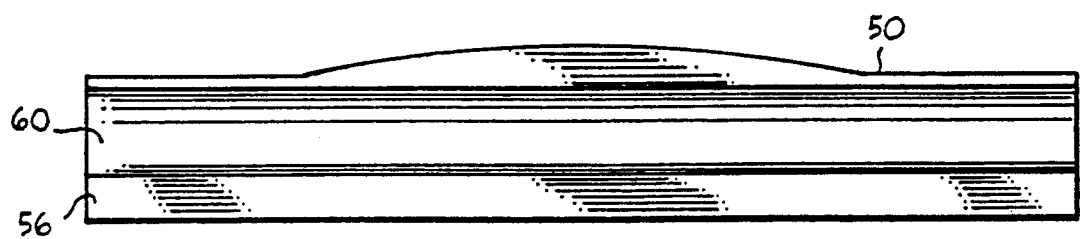
FIG. 5 is a longitudinal side view of an alternate embodiment of the bearing plate design of the present invention.

Bearing plates 30 are the primary load carrying members of the bearing. These plates are preferably formed of a suitable load-bearing metals such as, for example, stainless steel, 8620 or 52100 high carbon steel, etc. In a preferred embodiment of the present invention, bearing plates 30 are provided with longitudinal grooves 46 on the inner radial load-bearing surface 47 to minimize the hertzian stresses when the bearing assembly 20 is loaded on shaft 52. The grooves 46 conform in cross-sectional shape to a portion of the diameter of balls 48 defining a ceiling surface of load bearing path 68 and thereby increasing the contact area between the ball 48 and the bearing plate 30. The outer radial surface 50 is formed concentric to the shaft 52 to provide high rigidity, precision and increased load capacity as shown in FIG. 2. Alternatively, the outer radial surface may be axially crowned as in FIG. 5 to provide a self-alignment feature making the bearing assembly easier to use.

Both circumferential sides 54, 56 of bearing plate 30 are provided with axial grooves 58, 60 which form side walls for return paths 66 of balls 48. In this configuration, bearing plate 30 serves as both a load carrying member and guides balls 48 in the return path 66 of the ball track thus affording a much more efficient usage of the radial space surrounding the grooved cylindrical shaft 51.

Figure 3:
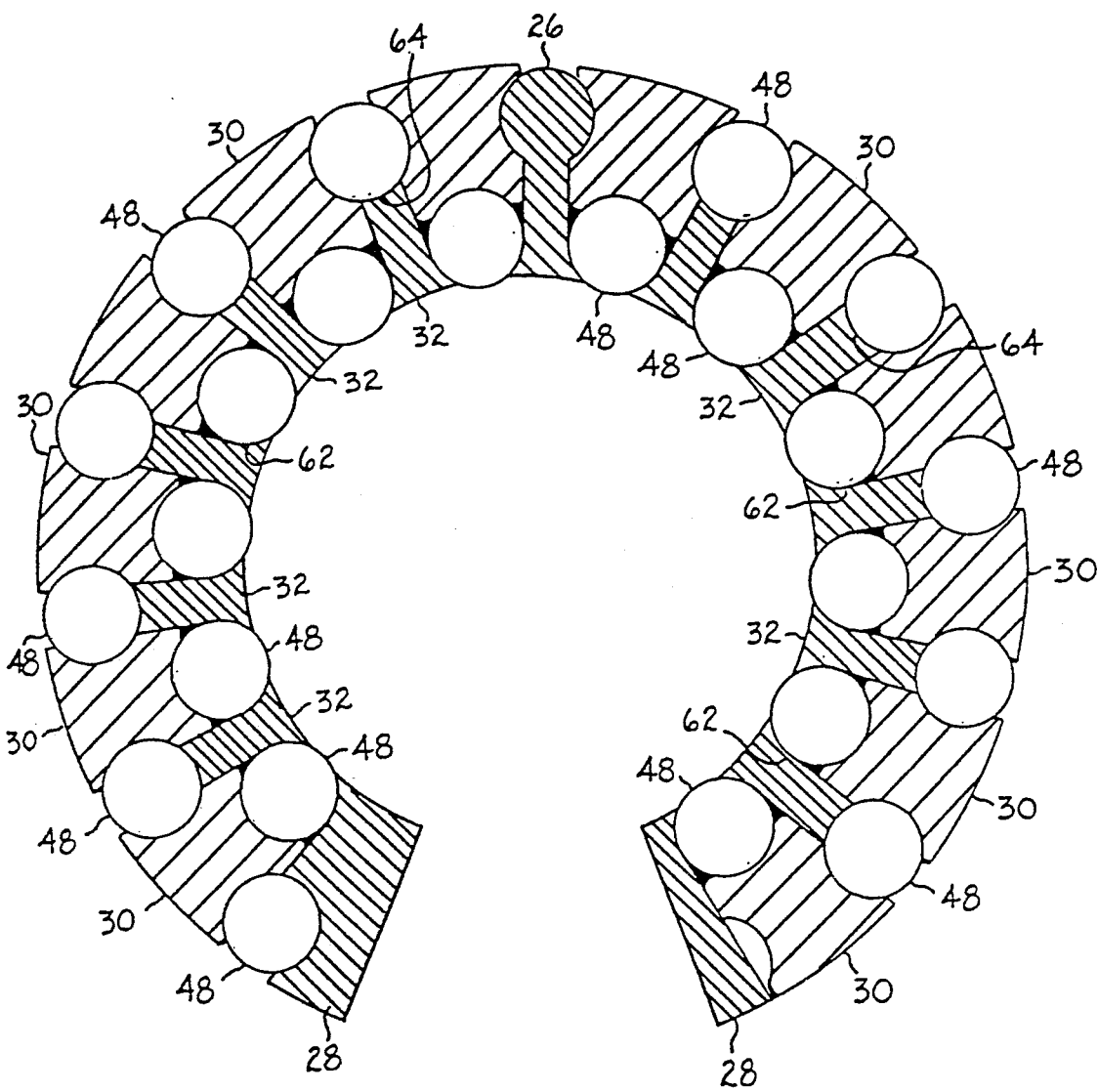
FIG. 3 is a side view in cross-section of a linear bearing in accordance with an embodiment of the present invention showing the unique bearing plates and axial ball retainers.

Referring to FIGS. 1-3, axial ball retainers 32 are essentially rectangular beams with a longitudinal flange portion 62 formed in the inner radial surface thereof and a groove 64 formed in an outer radial surface. Longitudinal flange portion 62 serves to retain balls 48 within the load bearing path 68 while groove 64 forms a floor portion of the return path 66. Thus, the load bearing path 68 is formed by opposing surfaces of adjacent ball retainers with the top portion formed by groove 46 in the inner radial surface of bearing plate 47. The return paths 66 are formed by grooves 58, 60 in opposing surfaces 54, 56 of adjacent bearing plates 30, with the floor portion being formed by groove 64 of axial ball retainer 32.

Half toroidal cavities 34 formed in the end caps 24 of housing 22 serve to interconnect corresponding load bearing paths and return paths such that balls 48 return at an angle in the radial space between adjacent load bearing paths. This angled ball return configuration allows for optimization of ball tracks quantities to the radial height of the bearing assembly.

The bearing assembly of the present invention is contemplated for use with a wide variety of shafts including cylindrical (FIG. 6), grooved cylindrical (FIG. 2), and other shafts well known to those skilled in the art.

Figure 6:
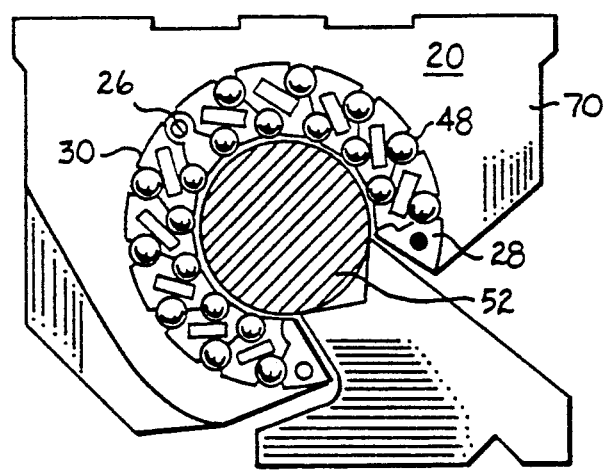
FIG. 6 is a side view of a bearing assembly incorporated into a side-mounted carriage for longitudinal movement along a single rail in accordance with one embodiment of the present invention.
Figure 7:
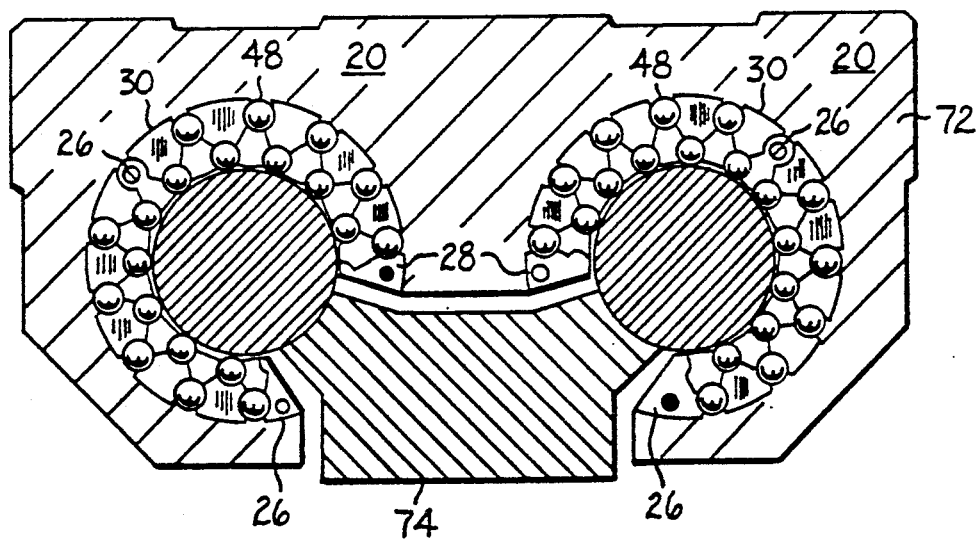
FIG. 7 is a side view of a bearing assembly incorporated into a carriage for longitudinal movement along a double rail in accordance with another embodiment of the present invention.

FIG. 6 shows a bearing assembly 20 in accordance with the present invention incorporated into a side mounted carriage 70. As shown, the radial space surrounding cylindrical shaft 52 is provided with a maximum radial height. Similarly, FIG. 7 shows the incorporation of two bearing assemblies 20 mounted in carriage 72 for linear reciprocal movement along twin shaft 74.

To the extent not already indicated, it also will be understood by those of ordinary skill in the art that any one of the various specific embodiments herein described and illustrated may be further modified to incorporate features shown in other of the specific embodiments.

The invention in its broader aspects therefore is not limited to the specific embodiments herein shown and described but departures may be made therefrom within the scope of the accompanying claims without departing from the principles of the invention and without sacrificing its chief advantages.

We claim:

1. A linear bearing assembly for movement along a shaft comprising:
   a housing having a pair of opposing end-caps with a plurality of radially angled ball turnarounds formed therein;
   a plurality of axial ball tracks with balls therein, having both load bearing paths and return paths disposed within said housing and radially arranged around said shaft in communication with said ball turnarounds;
   a plurality of ball retainers having means for retaining said balls in said load bearing paths and means defining a radial inner portion of said return tracks;
   a plurality of bearing plates longitudinally positioned in said housing, said bearing plates having a longitudinal groove formed in a radial inner sur-face thereof which groove forms a top surface of said load bearing path and substantially conforms to an arcuate surface of said balls and said bearing plates further having grooves formed in both circumferential sides for defining sidewall portions of said return tracks.

2. A linear bearing assembly as in claim 1 further comprising a plurality of inner guides positioned at the inner axis of said radially angled ball turnarounds.

3. A linear bearing assembly as in claim 2 wherein said inner guides are integrally formed on both longitudinal ends of said ball retainers.

4. A linear bearing assembly as in claim 2 wherein said inner guides are formed in the shape of half-cylinders.

5. A linear bearing assembly as in claim 2 wherein said inner guides are formed in the shape of half-cylinders.

6. A linear bearing assembly as in claim 1 wherein said bearing plate has a radial outer surface which is parallel to said radial inner surface.

7. A linear bearing assembly as in claim 1 wherein said end caps have a plurality of projections arranged annularly around the circumference, said projections interfitting with corresponding slots formed in said bearing plates.

8. A linear bearing assembly as in claim 1 further comprising carriage means enclosing a portion of said bearing assembly.

9. A linear bearing assembly as in claim 1 wherein said shaft is cylindrical.

10. A linear bearing assembly as in claim 9 wherein said cylindrical shaft is provided with longitudinal grooves therein to contact said balls in said load bearing paths.

11. A linear bearing assembly as in claim 1 wherein said bearing plate has a radial outer surface which is axially crowned relative to said radial inner surface.

12. A linear bearing assembly as in claim 1 wherein said housing is formed in two interlocking portions.

13. A linear bearing assembly as in claim 12 wherein said housing further comprises a plurality of axial extensions having interconnecting means disposed on a mating surface thereof.

14. A linear bearing assembly as in claim 13 wherein said housing is formed in two halves, each half including a top axial support portion and a pair of bottom axial support portions.

* * * * *